J. & H. L. CALLOW.
APPARATUS FOR MOLDING DOUGH.
APPLICATION FILED MAY 9, 1913.
1,176,648.
Patented Mar. 21, 1916.
5 SHEETS—SHEET 1.
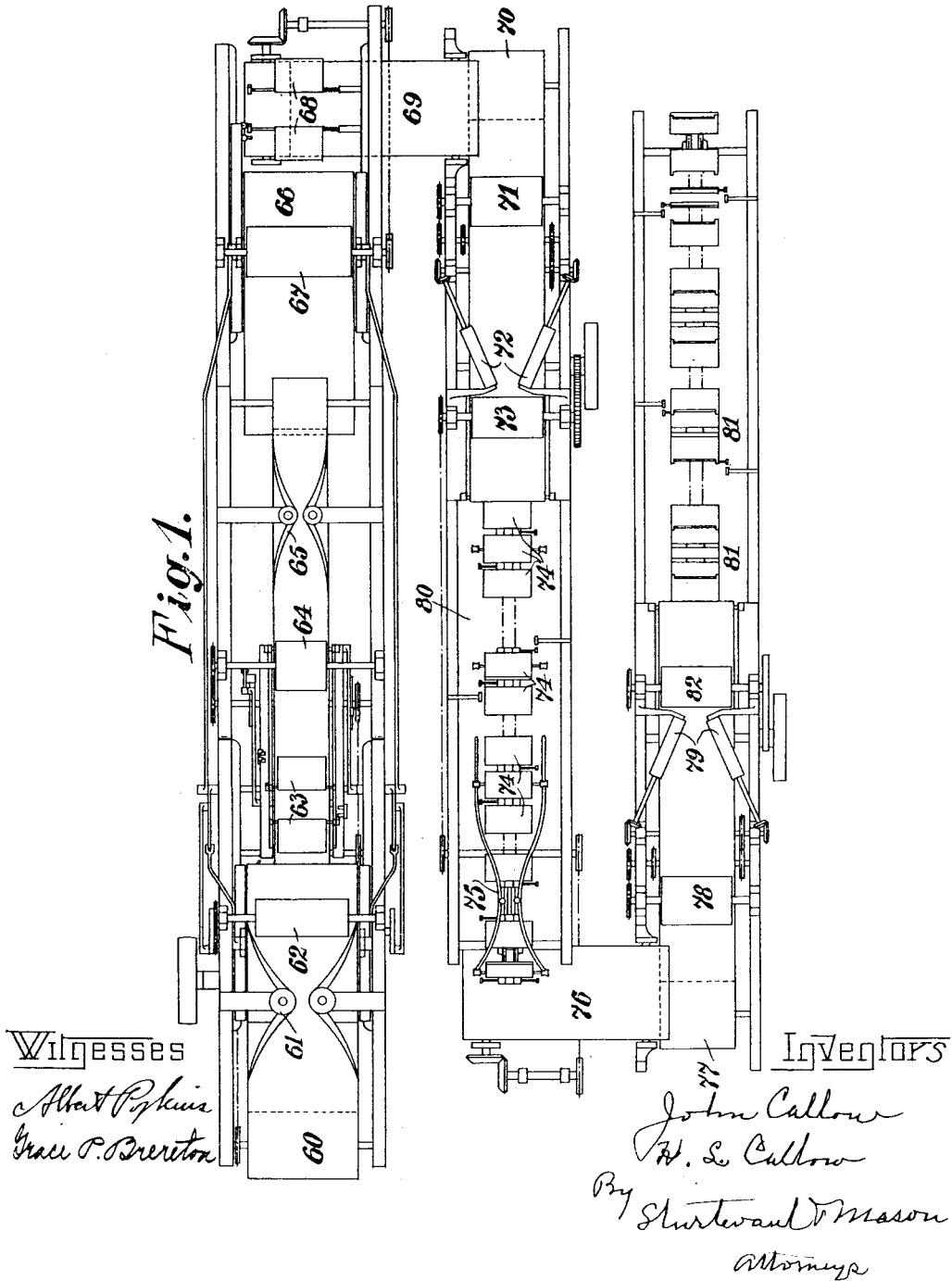

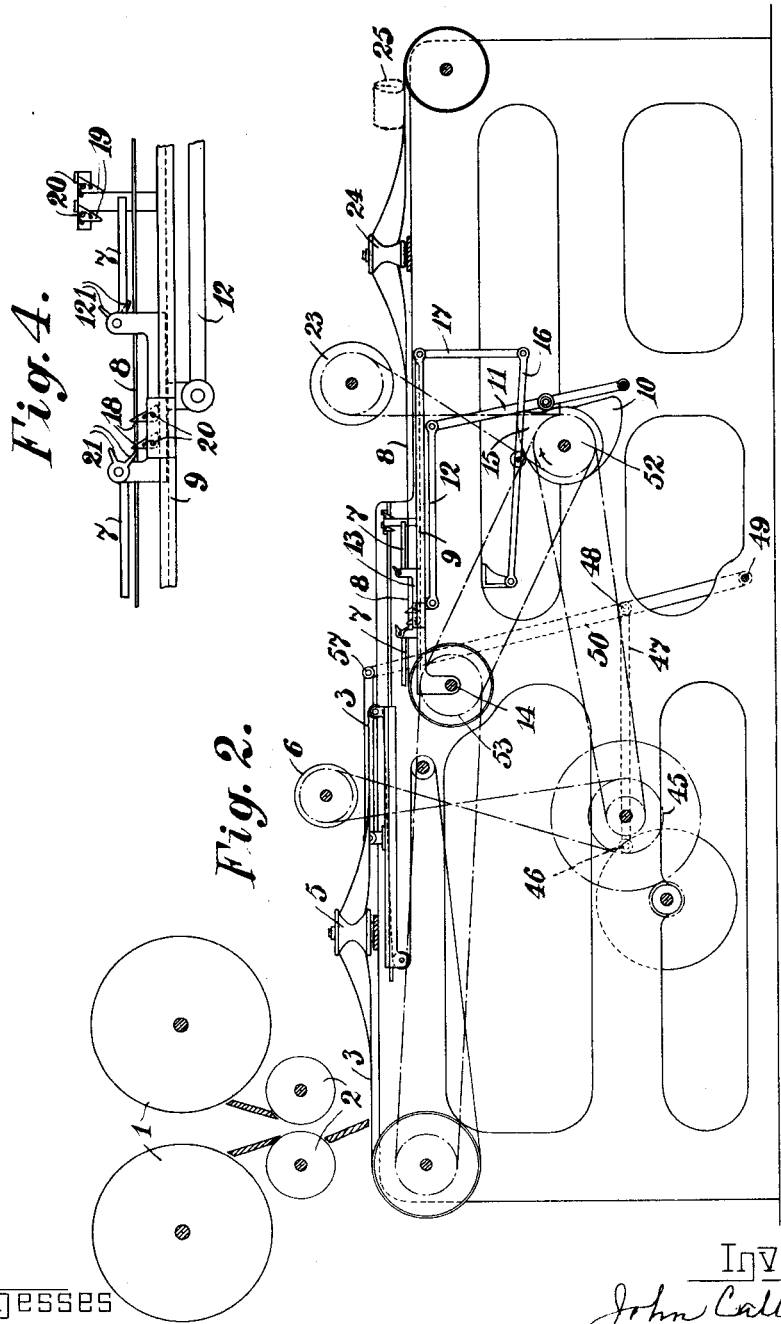

J. & H. L. CALLOW.
APPARATUS FOR MOLDING DOUGH.
APPLICATION FILED MAY 9, 1913.
1,176,648.
Patented Mar. 21, 1916.
5 SHEETS—SHEET 3.
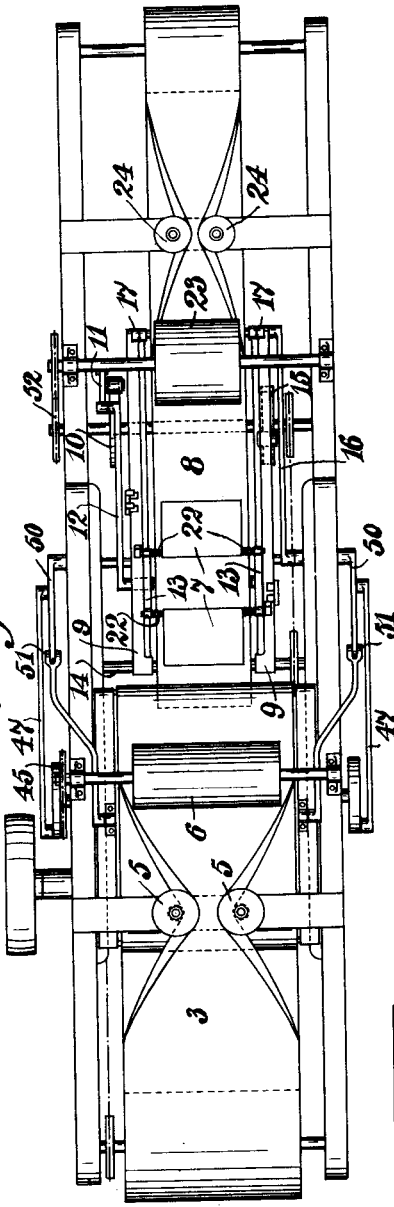
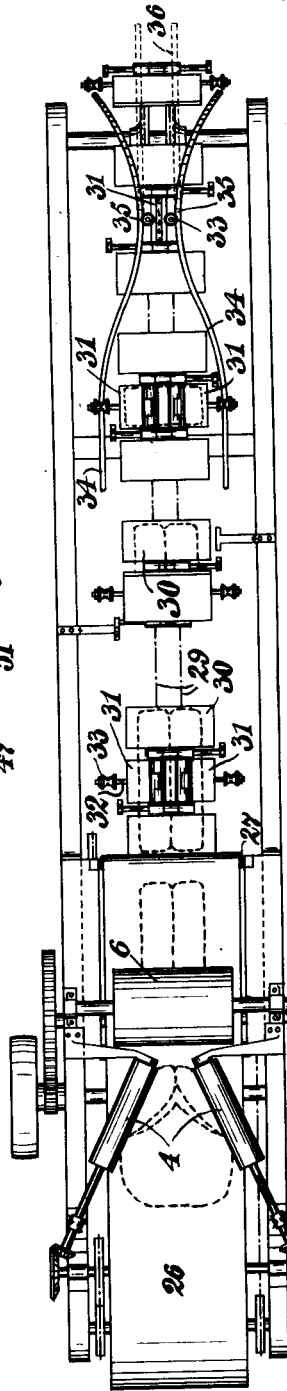

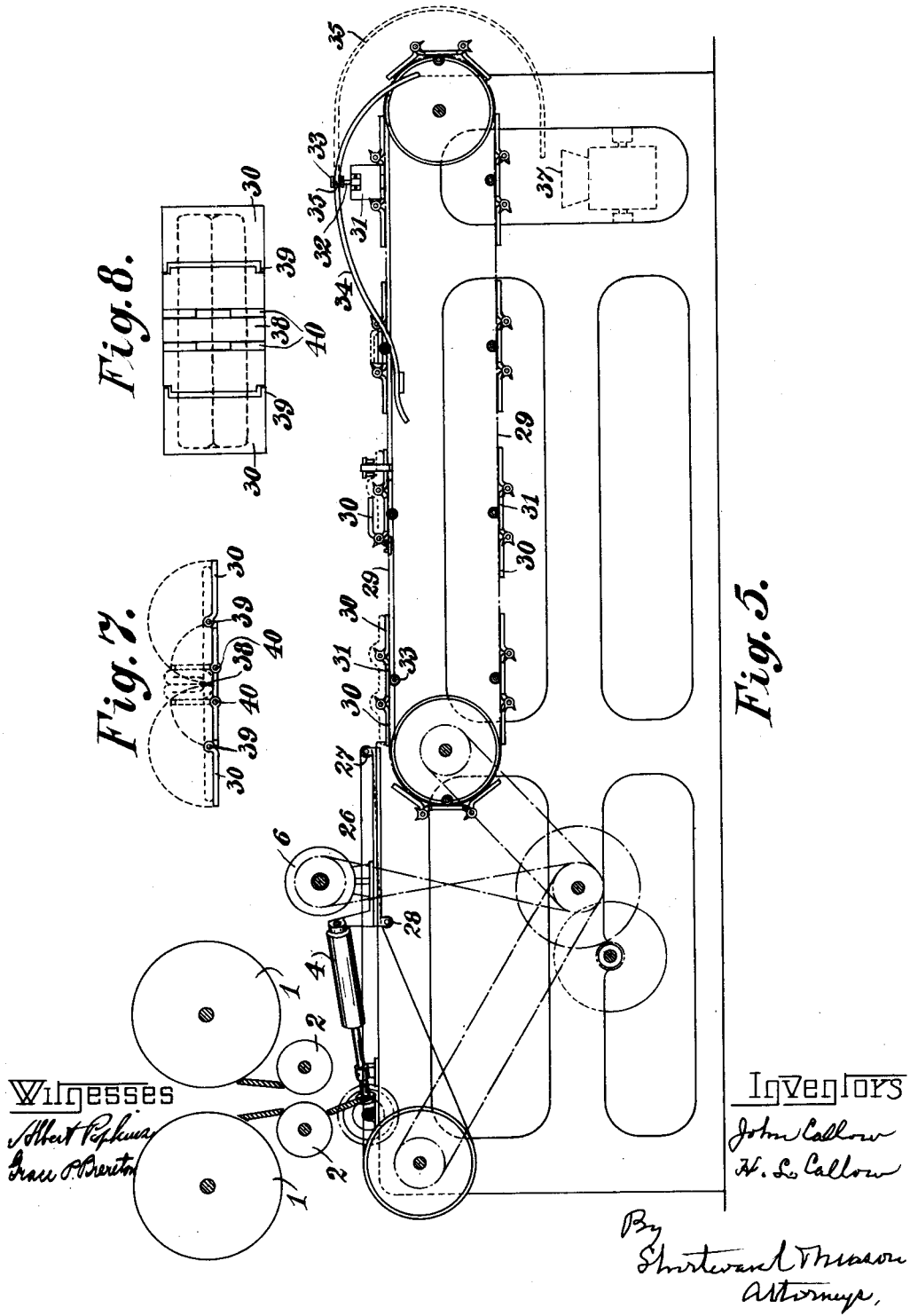

J. & H. L. CALLOW.
APPARATUS FOR MOLDING DOUGH.
APPLICATION FILED MAY 9, 1913.
1,176,648.
Patented Mar. 21, 1916.
5 SHEETS—SHEET 5.
FIG. 9.
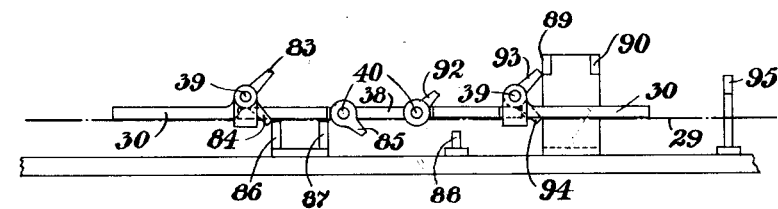
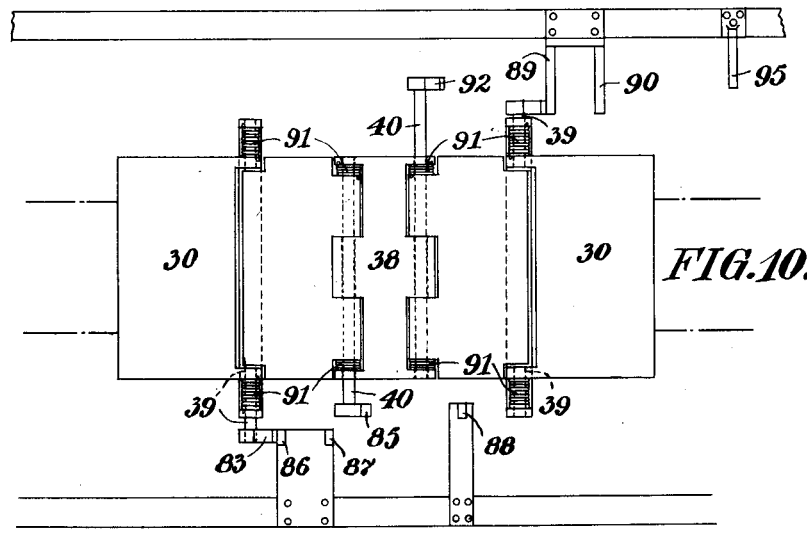
FIG. 10.
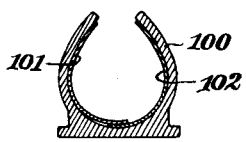
FIG. 11.
FIG. 12.
Witnesses
M. E. Shook
Albert Popkins
Inventors
John Callow
Herschel L. Callow
By
Sturtevant & Mason
Attorney

UNITED STATES PATENT OFFICE.

JOHN CALLOW AND HERSCHEL L. CALLOW, OF LIVERPOOL, ENGLAND.

APPARATUS FOR MOLDING DOUGH.

1,176,648.   Specification of Letters Patent.   Patented Mar. 21, 1916.

Application filed May 9, 1913. Serial No. 766,551.

*To all whom it may concern:*

Be it known that we, JOHN CALLOW and HERSCHEL LIVINGSTONE CALLOW, subjects of the King of Great Britain, residing at Liverpool, in the county of Lancaster, in the Kingdom of England, have invented certain new and useful Improvements in Apparatus for Molding Dough, of which the following is a specification.

This invention relates to the folding of dough to form, Scotch, tin, sandwich, or Irish turn-over bread and other like loaves, without hand manipulation.

The object of the invention is to provide a reliable apparatus for sheeting or slabbing and folding the dough pieces as they are received from the divider, by maintaining the dough in continuous movement during the whole of the folding operations.

According to this invention, the flattened dough pieces are first subjected while under continuous movement to the action of laterally disposed devices for the purpose of folding over their sides, so that their edges shall lap over or meet in the center, and then after being subjected to a flattening operation, the said dough pieces are folded or the edges lapped over one another by mechanically operated folders, adapted, during the time they are performing the folding operation, to advance at the same speed that the carrier is moving the dough pieces, and consequently there are no rest or stopping positions of the dough. The dough is then again flattened and afterward subjected to laterally disposed devices for the purpose of folding the dough into its final shape. The molding of the dough is done while it moves through the machine. When more than one carrier is used they may be set at right angles to each other when the folding tools can be so arranged that they need not rise to allow the folded dough to pass on to the next operation or the second folding can be performed by passing the carrier and dough through folding tools or a shoe.

One continuously moving endless carrier can be made to convey the dough pieces right through the machine, or two or more continuously moving endless carriers may be used, in which case the first may be of the type in which two of its rolls have a reciprocating movement as well as a rotary one, so as to alternately advance a bight of the carrier with the dough pieces resting thereon to folding tools arranged in connection with a second carrier, and withdraw it, the delivery of the dough pieces from the bight on to the second carrier being effected by the moving back of the bight of the first carrier. We will now describe the latter arrangement.

In the accompanying drawings: Figure 1 is a plan of an apparatus, parts of which are shown in detail in Figs. 2 to 8; Figs. 2, 3, 5 and 6 represent parts which can be operated alone; Fig. 2 is a side elevation, and Fig. 3, a plan view of one convenient arrangement of dough molding machinery embodying our invention; Fig. 4, a side elevation on an enlarged scale of the folders shown in Figs. 2 and 3; Fig. 5 is a side elevation; and Fig. 6, a plan view of another convenient arrangement of dough molding machinery embodying our invention; Fig. 7 is a side elevation, and Fig. 8, a plan view of a folding appliance for folding the dough twice in the same direction. Fig. 9 is a side elevation and Fig. 10 a plan view of the mechanism for operating the folders shown in Figs. 7 and 8. Figs. 11 and 12 are vertical transverse sections of a split belt device showing the split belt passing through the shoe and when in the plane position respectively.

The arrangement shown in Fig. 1 will be more clearly understood from the detailed drawings, in which however different reference numerals are employed. 60 is a belt on to which the dough is fed. 61 are rolls which bend the carrier so as to fold the dough. 63 are folders, 64 is a flattening roller, 65 rollers to bend the carrier. 66 is another carrier, 67 being a flattening roll. 69 is another carrier at right angles to 66 and 68 are folders. 70 is still another carrier, 71 a flattening roller, 72 folding rollers, 73 a flattening roller, and 74 folding tools carried on a carrier 80. 75 is a guide to cause the tools to operate. 76 and 77 are carriers, 78 a flattening roller, 79 folding rollers, 82 a flattening roller, and 81 folding tools. The folders 63 are reciprocating and fold the dough during the reciprocation. The folders 74 are mounted on the carrier 80 and fold while being carried around thereon. The folders 81 are also carried on a carrier. They are shown in detail in Fig. 7 while the folders 74 are shown in detail in Fig. 5.

Referring now to Figs. 2, 3 and 4, the dough is taken when proved and in the proper condition for being formed into loaves, the ball like portions of proved dough are delivered between pairs of rolls 1, 2 or pressure bands at the feeding end of the machine, which compress them and spread each of them into flat sheets and deposit them on to the continuously moving first endless carrier 3, driven so as to convey the sheets onward to a pair of rolls 5. These rolls are adapted to bend the carrier from its sides into channel shape, and turn up the lateral edges of the sheeted dough pieces on the carrier, and fold them inward so that their edges shall meet in the center Instead of rolls 5, a shoe or channel may be used. The continuous moving carrier carries the folded dough pieces below a positively driven pressure band or roller or rollers 6 disposed above the carrier 3 or other means for flattening them a second time into sheets or slabs. On leaving the space between the roller and band, the bight of the continuous moving carrier 3, conveys the now slabbed dough to folding tools 7 arranged in connection with the second carrier 8. Each of the dough pieces (which follow each other fairly rapidly) is brought in course up to the end of the bight by its forward travel, and there falls off the end on to the folding tools 7 arranged in connection with the second continuously traveling carrier 8. The crank pin 46 on the wheel 45 moves the link 47 and thus at 48 operates the rod 50 pivoted at 49. The end 51 of this rod effects the advance of the bight. The wheel 45 also transmits movement to the roller 6 and the wheel 52 and thence to 23 and 53. It will be seen therefrom that the object of the bight is to advance the dough, then, by withdrawing the bight, to deposit the dough at the proper place on the second carrier (which consists of an endless band) and at the proper moment to be received and operated on by the folders. These folders then at once commence to perform the folding operation, and at the same time as the folding movement is going on, travel onward at the same speed that the second carrier is traveling so that there is no rest or stop position of the dough. In one convenient application of the invention, these folders comprise a pair or pairs of pivotally mounted folding tools or arms, the hinged elements 7 of each pair being spaced apart for the purpose of regulating the size of the loaf, the said folders being mounted immediately above the carrier 8 on guide bars 9 so as to have a reciprocating motion. This reciprocating movement is derived from any suitable prime mover such as a cam 10 (or crank) or mechanism such as would give a reciprocating motion, operating for instance a lever 11 and connecting rod 12 which is coupled to the frame 13 to which the folders 7 are pivoted, the arrangement being such that during the time the folders are performing the folding operation, they will travel longitudinally parallel with the carrier 8 and hence the folding is done by or during the reciprocating movement of the tools. When they have completed the doubling or folding of the dough, they rise clear of the folded dough, and travel back in the return direction to repeat the operation on the next dough piece or pieces. This lifting of the folders 7 may be accomplished in various ways such as deflecting the guides, so that the folders shall rise clear, or by hinging the guides 9 at one end at 14, so that while normally they are held parallel with the carrier 8, they can be lifted at intervals about their pivot 14 into a sloping position, such as my means of a cam 15 operating a lever 16 and a connecting rod 17 coupled to the guides 9. The second carrier 8 may be arranged at right angles to carrier 3, when the folding tools can be so arranged that it is not necessary for them to lift after folding the dough. This is shown in Fig. 1 where the carrier 69 is at right angles to the carrier 66 and the folding tools 68 need not therefore lift.

18 and 19 are two pairs of stops mounted (in connection with each folding member 7) on the guide bars 9 by means of stop hinges 20, and the folders 7 are provided with tappets 21 and 121. In the course of their forward travel, one of the tappets 21 of the rear folder, strikes the first stop 18 and so turns the folder 90 degrees and immediately afterward the other tappet 21 strikes the second stop 18 and so completes the folding of the rear end of the dough piece. The rear folder may be turned back by the action of a spring 22, and immediately after one of the tappets 121 strikes against one of the stops 19 and directly afterward the other tappet strikes against the other stop 19, thus folding the front end of the dough piece. This front folder then springs back by the action of its spring 22, leaving the dough folded into a form of triple thickness. The object of making the stops with stop hinges, is to enable them to act as clicks, so as to give if necessary when the folders slide back. We do not however limit our invention to any particular type of folding tools, as any suitable kind of folding tools or appliances may be used. The said folders 7 are adapted to fold the dough at right angles to the folds given to the dough by the rolls 4 or shoes. When this folding is completed, and the folders have risen clear of the folded dough, such folded dough (still continuously moved onward by the carrier 8) is presented to another flattening appliance such as a positively driven band or a roll 23 which flattens the dough, and on leaving this pressure device 23, the carrier 8 passes through a channel formed for example by opposing spaced rolls 24 having surfaces made of the required shape and axes set at the required angles (or by a shoe) adapted to bend the flexible carrier 8 from its sides into channel shape in cross section, and so impart a lateral folding action to the dough which molds it into its final shape 25. This bending of the carrier from its sides, is performed gradually and the band may be slit to facilitate this, the bend commencing at a point in advance of the flattening appliance 23 (where the carrier 8 is flat) and gradually increasing to its maximum at the place where the carrier passes between the rolls or shoe. Then the carrier after passing the rolls or shoe, gradually straightens itself transversely again, and the dough after receiving such final shape falls off the carrier by gravity on to a delivery band or is taken off by hand. The various operations and the appliances for effecting them, may, if desired, be repeated oftener than has been mentioned. Furthermore the rolls 5 for folding over the sides of the dough pieces may be replaced by the channel or shoe through which the carrier passes, or the rolls 24 may even have substituted for them, the channel or shoe for giving to the dough its final shape.

A certain amount of slack may be provided in the carrier if desired, to enable it the more easily to pass through the channel or shoe and bend from its sides into channel shape. In such a case a loaded or spring jockey roller may be provided if desired which will yield a little to pay out the necessary slack, or take it up. Also the carrier may be slit to assist in deflecting it when passing through the shoes as above mentioned.

It is not essential for the first carrier 3 to be of the type which has an advancing and retreating bight. For instance it may be an ordinary endless carrier 26 (Figs. 5 and 6) passing around rolls that revolve in a uniform position, but the roll 27 at the leading end is preferably small, and a jockey roll 28 is provided between the two rolls to keep the leading end of the advancing and returning portions of the carrier parallel, and very close together, and so form as it were a thin non-advancing or retreating bight. The second carrier 29 is an endless one, having hinged to the surface thereof, the folding tools or arms 30, the elements of which are spaced apart, so as to allow the dough to be folded the proper size. A number of these folding devices 30 are attached to the carrier 29, all along it at intervals apart, corresponding to the spacing or positioning of the dough pieces on the first carrier 26, and these folders travel with the second carrier 29, moving forward with the carrier after receiving a dough portion, and returning after delivery of the dough portion, to the front end with the returning portion of the carrier to receive a fresh charge. In these figures the rolls 5 of Figs. 2 and 3 may have substituted for them, diagonal rolls 4 which turn up the lateral edges of sheeted dough pieces on the carrier, and fold them inward. In action therefore the leading end of the first continuously moving carrier 26 places a charge of folded dough flattened into suitable shape on one of the folding appliances 30 of the second continuously moving carrier 29, so that the dough rests on the carrier and on the folding arms or tools. These arms or tools as the carrier travels on, act to bring together the two opposite ends of the flattened dough and fold and compress them on to the center portion which lies upon the carrier so that the dough assumes the form of a triple layer somewhat compressed, and then when these arms or tools 30 have turned back, two other arms or tools 31 bring together the two opposite sides of the dough piece and fold and compress them. These operations are effected during the travel of the carrier and finally the folded and compressed dough piece falls off the carrier by gravity or is taken off by hand, or when required to hold the loaf until it comes over a tin or the like placed underneath to receive it, that is to say in the case of tin bread. The folders return with the returning length of the carrier 29. The object of bringing the advancing and returning portions of the leading end of the first carrier 26 close together is to enable the leading end to insinuate itself into a position immediately and only very slightly raised above the surface of the second carrier 29, so that the dough will only have a short distance to fall from the first carrier on to the second.

If desired one carrier only may be used, as the dough from the sheeters may be deposited on the folders of this carrier, and have its edges turned up and pressed and then the folders operate to do the required folding. The folders 30 of Figs. 5 and 6 may for example be operated in a manner similar to that described in connection with Figs. 2 and 3. A convenient way of operating the folders 31 is to provide each folder with an arm 32 having an anti-friction roller 33 at the end. These rollers 33 come in due course against the upwardly and inwardly curving fixed tracks 34, and travel along them, and so turn up the folders 31 and the dough on them, whereby the final shape is given to the dough when the folders reach the point 35. The track now curves outwardly and downwardly, thus causing the folders to separate, but leaving the dough folded which then falls off the carrier by gravity as already described, or is taken off by hand. Instead however of making the said tracks 34 curve outwardly and downwardly as described, they may be continued in parallel planes as shown by dotted lines 36, Fig. 5, so that the folders 31 will continue to hold the dough until it comes over a pan 37 placed underneath to receive it. Here the tracks 36 end, and the folders 31 fly back by the action of springs thus liberating the dough.

It will be seen that the folders 30 and 31 fold the dough twice in opposite directions. It has however already been mentioned that any suitable type of folding tools may be used, and that the machine is applicable for forming Irish turnover bread. For this purpose the folders may be arranged to fold the dough twice in the same direction. This may be effected by providing pivoted folders 30 as before pivoted at 39 but auxiliary folders are provided hinged at 40 at each side of the center part 38 (Figs. 7 and 8) the axes of all the hinges 39 and 40 being parallel. In action the folders 30 turning on their hinges 39 fold over the ends of the dough piece so that their edges meet in the center, and then after the said folders 30 have turned back, the hinges 39 are kept rigid, and the auxiliary folders turn on their hinges 40 and fold the dough piece a second time in the same direction.

The mode of action of these folders will be seen more clearly from Figs. 9 and 10. The axes of the hinged parts are provided with torsional springs 91 which serve to effect the return movement of the folders. The actual folding movement itself is effected by tappets engaging with catches on the frame of the machine. Thus the left hand flap 30 is first rotated through 90° by the tappet 84 engaging the catch 86. The tappet 83 then engages the catch 87 thus effecting a further rotation through 90°. The right hand flap 30 is similarly rotated by the catches 89 and 90 engaging the tappets 93, 94. The inner flaps are simply rotated through 90° by the tappets 85 and 92 engaging the catches 88 and 95.

We have already mentioned that instead of the opposing spaced rolls 5 and 24 a shoe or channel may be used, consisting for example of a pair of cheeks having a shape corresponding approximately to the curvature of the rolls, and adapted to bend the carrier from its sides into channel shape, and to fold the dough that is lying on it. We do not however limit ourselves to any one form or arrangement of the folding tools 4, 5, 7, 24, 30, 31 or shoes nor to any particular type of machine, as our invention may be advantageously employed in variously constructed machines for the folding or like treatment of dough.

Figs. 11 and 12 show the split belt device mentioned above. 100 is a shoe or channel by which folding may be effected by passing the belt therethrough. We find that a much better effect is obtained by splitting the belt since this enables lateral divergence thus causing the skin of the dough to become tight. Fig. 11 shows the two portions of the belt split, longitudinally, passing through the shoe where they have diverged from the position shown in Fig. 12. In the plane position as in Fig. 12, it is desirable that the belts should overlap somewhat so that when divergence takes place in the deflected position, the belts shall not separate so far as to leave a gap between them.

We declare that what we claim is:—

1. A dough molding apparatus comprising an endless carrier, means to move said carrier continuously, and compound folding tools spaced apart on said carrier and adapted to impart to a slab of dough two folds at right angles.

2. A dough molding apparatus comprising an endless carrier, means to move said carrier continuously, and compound folding tools spaced apart on said carrier comprising two pairs of pivoted flaps with their axes at right angles.

3. A dough molding apparatus comprising an endless carrier, means to move said carrier continuously, compound folding tools comprising two pairs of pivoted flaps with their axes at right angles, curved tracks, and members adapted to run in said tracks and to cause the inner pair of flaps to effect the folding operation.

4. A dough molding apparatus comprising an endless carrier slit longitudinally, and a device for deflecting the edges of said carrier.

5. A dough molding apparatus comprising an endless carrier, means to move said carrier continuously, compound folding tools comprising two pairs of pivoted flaps with their axes at right angles, converging tracks, and members adapted to run in said tracks and to cause the inner pair of flaps to effect the folding operation.

6. A dough molding apparatus comprising an endless carrier, pivoted flap folding tools, means to deliver slabs of dough thereto, and means to rotate said folding tools about axes parallel to the direction of movement of the carrier comprising members connected therewith and engaging converging tracks.

7. A dough molding apparatus comprising an endless carrier, and compound folding tools spaced apart on said carrier and adapted to impart to a slab of dough two folds at right angles.

8. A dough molding apparatus comprising an endless carrier, and compound folding tools spaced apart on said carrier comprising two pairs of pivoted flaps with their axes at right angles.

9. A dough molding apparatus comprising an endless carrier, compound folding tools comprising two pairs of pivoted flaps with their axes at right angles, curved tracks, and members adapted to run in said tracks and to cause the inner pair of flaps to effect the folding operation.

10. A dough molding apparatus comprising means to move dough pieces forward, in combination with pivoted flap-folding means adapted to operate on the moving dough to bring both edges together near the center of the piece, and means to perform a folding operation at right angles to the first fold, all arranged so that the whole folding operation is effected under continuous movement.

In witness whereof, we have hereunto signed our names this 28 day of April 1913, in the presence of the subscribing witnesses.

JOHN CALLOW.
HERSCHEL L. CALLOW.

Witnesses to the signature of the said John Callow:
G. C. DYMOND,
W. H. BEESTON.

Witnesses to the signature of the said Herschel Livingstone Callow:
A. S. WITHERDEN,
H. K. JENNINGS.